March 13, 1934.  F. W. SEELERT  1,950,522
PILOT FOR VALVE SEAT FACING TOOLS
Filed March 2, 1931  2 Sheets-Sheet 1
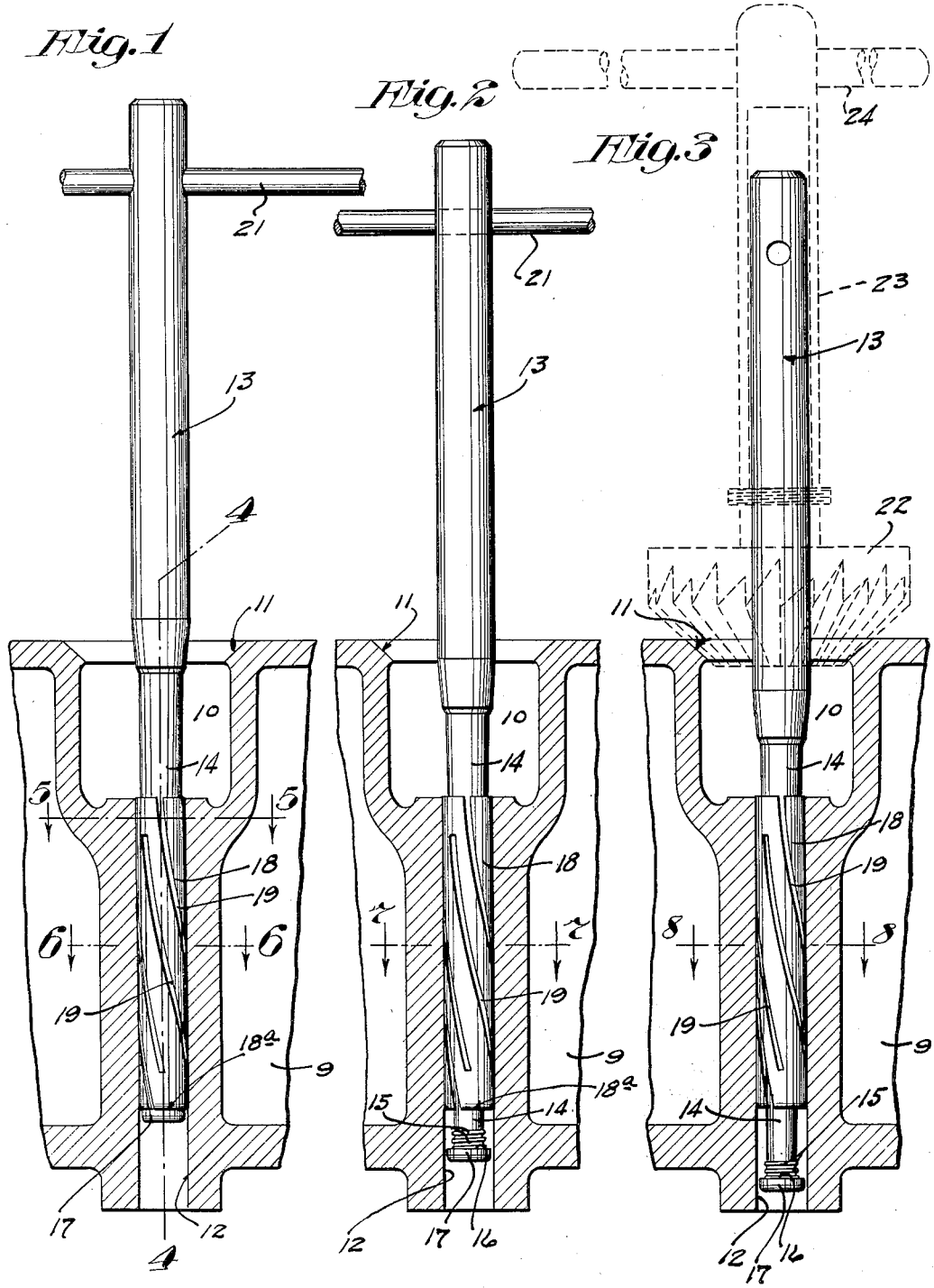
Inventor
Frederick W. Seelert
By his Attorneys March 13, 1934.   F. W. SEELERT   1,950,522
PILOT FOR VALVE SEAT FACING TOOLS
Filed March 2, 1931   2 Sheets-Sheet 2
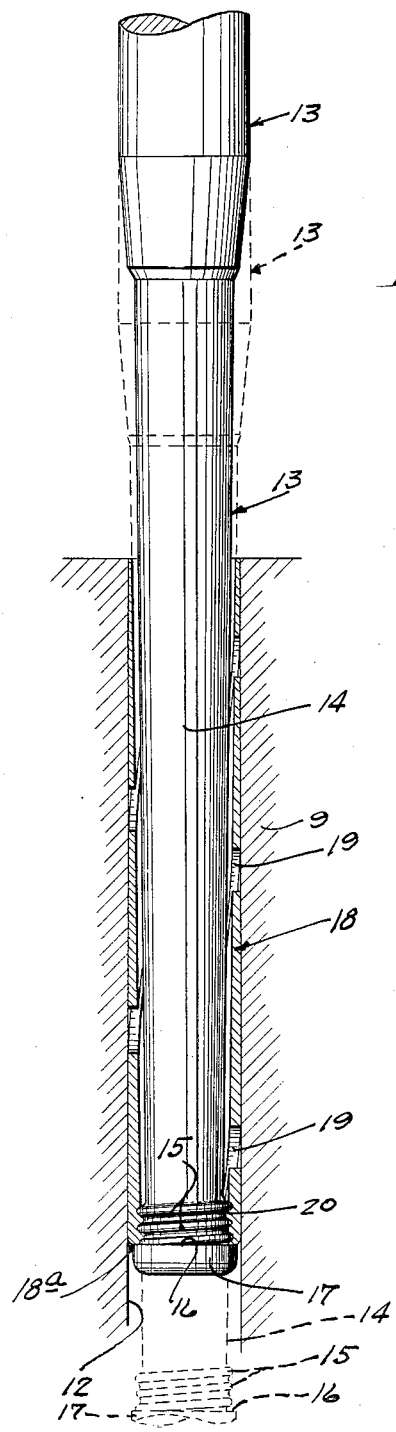
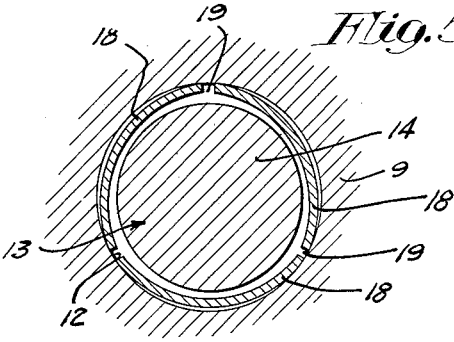
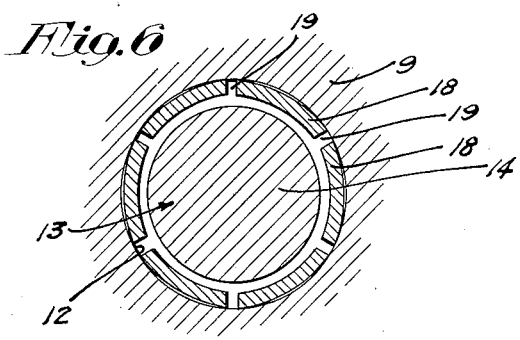
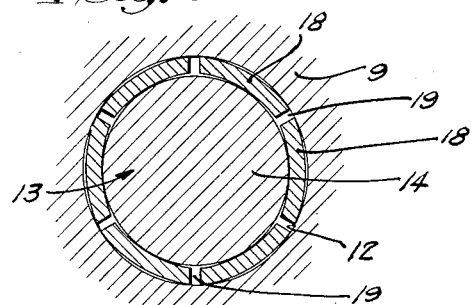
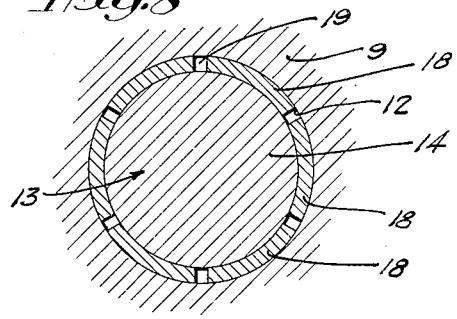
Inventor
Frederick W. Seelert
By his Attorneys Patented Mar. 13, 1934

1,950,522

UNITED STATES PATENT OFFICE 1,950,522

PILOT FOR VALVE SEAT FACING TOOLS

Frederick W. Seelert, Minneapolis, Minn.

Application March 2, 1931, Serial No. 519,413

3 Claims. (Cl. 90—12.5)

My present invention relates to improvements in a centering pilot for valve seat facing tools such for example as valve seat grinders or reamers and particularly to the type of centering pilot which includes a tapered stem having an expansible bushing slidably mounted thereon, the bushing being adapted to be inserted into a valve stem guide cooperating and coaxial with a particular valve seat to be worked on and be tightly wedged therebetween and the tapered stem by said tapered stem when the same is forced thereinto. Among the important objects of the invention is the provision of a device of the character set forth incorporating means for preventing the stem from coming into accidental wedge engagement with the bushing and expanding the same while inserting the bushing-equipped portion of the stem into a guide by pressure applied to the stem beyond the bushing and being thereafter releasable to permit the stem to be brought into wedging engagement with the bushing and thereby expand the same tightly against the guide and bringing the stem into positive co-axial alignment with said guide.

The above and other important objects of the invention will be clearly brought out in the following specification.

Generally stated, the invention consists of novel devices, combinations of devices and arrangement of parts hereinafter described and defined in the claims.

In the accompanying drawings, which illustrate the invention, like characters indicate like parts throughout the several views.

Referring to the drawings:

Figs. 1, 2, and 3 are views of my pilot showing the same in side elevation and illustrating different conditions thereof in a valve stem guide of a motor, the guide and its cooperating valve chamber being shown in axial section and other parts of the motor being broken away;

Fig. 4 is an enlarged fragmentary view taken on the line 4—4 of Fig. 1, some parts being broken away;

Fig. 5 is a sectional view taken on the line 5—5 of Fig. 1 and is on a still further enlarged scale;

Fig. 6 is an enlarged sectional view similar to Fig. 5. but taken on the line 6—6 of Fig. 1;

Fig. 7 is a sectional view taken on the line 7—7 of Fig. 2 and enlarged on a scale corresponding to Figs. 5 and 6; and Fig. 8 is a similarly enlarged sectional view taken on the line 8—8 of Fig. 3.

The motor block, of which only a fragmentary portion is shown, is indicated by the numeral 9, the valve chamber formed therein is indicated by 10, the valve seat by 11, and the cooperating valve stem guide by the numeral 12.

My improved pilot includes a pilot stem or mandrel 13 that is formed near one end thereof with a long gradually tapered portion 14 and beyond the said tapered portion with radially projecting screw threads 15 that terminate against a still further radially projecting shoulder 16 formed by an enlarged head 17 at the extreme end of the stem. Mounted on this tapered portion 14 of the stem 13 is an expansible bushing 18 that is in the form of a relatively thin sleeve having a cylindrical outside surface and an inside that is tapered substantially through its entire length to a degree corresponding to that of the tapered portion 14 of the stem and which sleeve is provided with circumferentially spaced slits 19. In the preferred form of the device illustrated, these slits 19 are made spiral and are extended alternately from opposite ends of the bushing toward and terminated close to but short of the other end of the bushing. The bushing 18 at one end is provided with incut internal threads 20 that are arranged to engage the external screw-threads 15 at the reduced end portion of the stem 13.

The several slits 19 divide the intermediate portion of the bushing cross-sectionally into a plurality of segments and the end portions thereof beyond certain of the slits into a lesser number of larger segments.

The bushing when on the tapered portion 14 of the stem and in a normally undistorted condition and when the screw threads 20 thereof are disengaged from the threads 15 is free to be slid axially the full length of the taper 14 without being expanded thereby but in the preferred form illustrated the tapered inside of the bushing is normally of just the right size and snugly fits the taper 14 of the stem 13 when moved to the extreme large end thereof and in this condition all of the segments of the bushing conform to the arc of an underlying portion of the stem. In use, however, the tapered portion 14 of the stem is never inserted into the bushing to its fullest extent even when it is being used in largest size valve guide for which it is intended to be used so that the inside of each bushing segment throughout its length will in a normal undistorted condition conform to an arc larger than that of the engaged or underlying portions of the stem. In other words, the tapered inside portion of the bushing is turned so that all of its segments conform to an arc larger than that of the largest stem portion over which it will be moved in use. When the bushing 18 is in the normal undistorted condition on the stem its threads 20 are adapted to receive and loosely engage the threads 15 of the stem. The bushing is, therefore, free to be diametrically contracted at its threaded end even when the threads 20 are engaged with the threads 15 to slightly less than its normal diameter.

Removal of the bushing 18 from the tapered portion of a stem or replacement of the same on the stem is accomplished by forcing the bushing against the head thereby expanding the bushing by camming action of the head thereon sufficiently to admit the head and then sliding the bushing axially over said head. The bushing, when not confined, is readily expanded sufficiently to admit the head 17 and is sufficiently resilient to contract thereafter to its normal diameter.

Preparatory to inserting the bushing-equipped end of the pilot into the valve stem guide 12 the threaded end of the bushing is screwed into the threads 15 of the stem until that end of the bushing comes into engagement with the shoulder 16 formed by head 17 and, as previously stated, the threads 20 of the bushing, which is now in a normal condition, will only loosely engage the threads 15 of the stem so that the bushing will be free to be diametrically contracted. The bushing may now be started into the valve guide 11 and when once started therein will be held thereby against expanding movements so that the threads 20 thereof are positively locked in threaded engagement with the threads of the bushing and the bushing thereby held against accidental axial movements in respect to the stem.

The pilot is now inserted further into the valve guide until the bushing comes to a desired position therein which will usually be a position wherein the top of the bushing is approximately even with the top of the guide substantially, as shown in Fig. 1. This inserting of a pilot into the guide may be accomplished entirely by downward pressure applied to the upper end of the pilot stem beyond the bushing, for the bushing and stem being in threaded engagement will move together as a unit the bushing being pulled into the guide by the stem. After the bushing has thus been properly located in the guide the threads of the stem are disengaged from the threads of the bushing by rotating the stem in respect to the bushing, the bushing being in a somewhat contracted condition and therefore having sufficient frictional engagement with the guide to be held thereby against rotary movements with the stem. Attention is here called to the fact that the spirally slit bushing, due to the spiral form of its segments, is more highly resistant to initial circumferential expanding and contracting movements than would be a similar bushing having a like number of straight or axially extended slits and will, therefore, more tightly engage the sides of a valve guide by reason of its own tension than would a similar bushing having straight slits. In other words, the spirally slit bushing will have better initial grip on a valve guide than would a straight slit bushing. The reason for the above is that in the spirally slit bushing it is necessary to spirally bend or twist each segment thereof in order to initially contract the same, whereas, in a straight slit bushing the segments need only bend longitudinally when the bushing is initially contracted and obviously, it will require more effort to spirally twist the segments of the spiral bushing than would be required to longitudinally bend the segments of a straight slit bushing.

In practice it has been found that this added resistance to expanding and contracting movements of the bushing, due to the spiral form of its segments, is very important in that it permits successful use of pilot in a valve guide of only slightly less diameter than pilots bushing, say only .001 or .002 of an inch, and when so used, the bushing will, by its own tension, grip the valve guide with sufficient pressure to be held thereby against accidental movements therein during the time the stem is being turned out of threaded engagement with the bushing and into initial wedging engagement therewith.

After the threads 15 and 20 are disengaged the stem will move freely through the bushing to the position shown in Fig. 2 wherein its tapered portion 14 is just beginning to frictionally engage the inside of the bushing, as illustrated in Fig. 7.

The bushing being normally of larger diameter than the valve guide will be contracted to slightly less than its normal diameter when inserted into the valve guide, this being accomplished by initial inserting movements of the bushing into the guide and by camming action of the upper end of the guide on the outer surface of the screw-threaded end of the bushing which is rounded at 18ª. It should here be noted that in the position of the parts shown in Figs. 2 and 7 wherein the bushing is slightly contracted and the stem is only lightly engaged with the inside of the bushing that the bushing segments conform an arc larger than that of the underlying portions of the tapered stem and, therefore, engage the stem only at their central portions and the outside of the bushing segments conform to an arc larger than that of the guide and engage the guide at their opposite sides so that the bushing has much greater frictional contact with the guide than with the stem.

The pilot is tightly secured in the guide by forcing the stem as far as possible into the bushing to the position shown in Figs. 3 and 8 thereby wedging the bushing tightly between the guide and stem and rounding out the segments thereof to conform at their outsides to the arc of guide and at their insides to the arc of the stem and bringing the stem into positive co-axial alignment with the guide and cooperating valve seat. This final tightening of the pilot in the guide is best accomplished by simultaneously pressing downward on and imparting slight rotary movement to the stem by means of a hand-piece 21 that is slidable in a hole provided therefore in the upper end portion of the stem 13. During such movements the bushing is caused to remain stationary in the guide due to its much greater frictional contact with the guide than with the stem and due to the very slight taper of the stem in the inside of the bushing, it does not take great force to produce a very tight wedging engagement between the stem and guide.

To remove the pilot from the guide the stem is first drawn out of wedging engagement with the bushing and the threads thereof screwed into the threads of the bushing and then the entire assembly is withdrawn from the guide as a unit.

In Fig. 3, a valve seat facing tool in the form of a reamer is shown by dotted lines and indicated by the numeral 22 and is provided with a hollow stem 23 applied through the top of which is a suitable handle 24. The reamer 22 and stem 23 are slipped over the upper end of the stem 13 when the handle 21 is removed therefrom and are positively held in co-axial alignment with the guide during the valve seat surfacing operation.

What I claim is:

1. A centering pilot for valve seat facing tools comprising a pilot stem having a tapered portion near one end thereof, an expansible bushing slidable on the tapered portion of said stem and having a tapered inside surface adapted to be engaged by the tapered stem when the stem is forced thereinto, said bushing being provided with a plurality of slits dividing it cross-sectionally into segments and the inside of each of said segments conforming to an arc larger than that of the largest portion of tapered stem with which it is engaged in use.

2. A centering pilot for valve facing tools comprising a pilot stem having a long gradually tapered portion and slidable on said tapered stem portion an expansible bushing adapted to be inserted into a valve guide or the like and be wedged tightly against the sides thereof by said stem when the tapered portion of the stem is forced thereinto, the bushing being provided with circumferentially spaced slits dividing the same cross-sectionally into segments, the outside of each of said segments normally conforming to an arc larger than that of the largest guide for which it is intended to be used and the inside of the bushing segments conforming to an arc larger than that of the largest portion of the stem taper brought into engagement therewith to expand the bushing.

3. A pilot for valve facing tools comprising a pilot stem having a relatively long gradually tapered portion and slidably mounted on said tapered portion an expansible bushing adapted to be inserted into a valve guide and be wedged tightly therebetween and the tapered stem when the stem is forced thereinto and having tapered inside surfaces extending substantially the full length thereof, said stem beyond its taper being provided with screw-threads and said bushing near the end of its tapered inside surface being provided with screw-threads adapted to engage the stem threads, the taper of the inside of the bushing corresponding to that of the stem but the diameter thereof being greater than that of the stem at points covered by the bushing when the threads are engaged so that the tapered portion of the stem is capable of being brought into wedging engagement with the tapered inside surface of the bushing only after the screw-threads are disengaged.

FREDERICK W. SEELERT.